BILEVEL VIDEO SIGNAL RECONSTRUCTION CIRCUIT

Filed July 1, 1968

INVENTOR
CARL R. CORSON
BY John T. O'Halloran
ATTORNEY

United States Patent Office 3,528,018
Patented Sept. 8, 1970

3,528,018

BILEVEL VIDEO SIGNAL RECONSTRUCTION CIRCUIT

Carl R. Corson, Trenton, N.J., assignor to RCA Corporation, a corporation of Delaware
Filed July 1, 1968, Ser. No. 741,617
Claims priority, application Great Britain, July 3, 1967, 30,547/67
Int. Cl. H03k 5/01
U.S. Cl. 328—164 5 Claims

ABSTRACT OF THE DISCLOSURE

A bilevel reconstruction circuit eliminates pulse width distortion in bilevel video signals so as to provide an accurate replica of the original video signal prior to the introduction of such distortion.

BACKGROUND OF THE INVENTION

Mechanical and photographic techniques of composing types are relatively slow and the probability of increasing the speed of such type composition systems by a significant amount appears to be small. The successful transformation of type composition into an electronic art promises to increase greatly the speed of type composition. Recently, electronic photocomposition systems have become commercially available. One such system utilizes an imaging device such as a cathode ray tube to create characters by a plurality of adjacent scan lines that form slices of the characters. The cathode ray tube beam is turned on and off by a bilevel video signal while the beam scans in a linear sweep. A memory is incorporated into such electronic photocomposition systems to store instructions as to when the cathode ray tube beam should be blanked and unblanked to provide the character slices at the right times. The characters so formed on the cathode ray tube are imaged onto photographic film for later processing into printing plates. Such electronic photocomposition systems are being called upon to process an ever increasing amount of graphic material at high operating speeds and to do so while maintaining an impeccable quality in the construction of the graphic characters.

The circuits that process the bilevel video signals that effectively form the characters on the imaging device are operated at the upper limits of their operating speeds. Such operation frequently results in considerable pulse width distortion of the bilevel video signals which in turn results in poor graphic characters being formed in the imaging device. The problem is further complicated by the fact that at times the bilevel video signals have to be transmitted over comparatively long distances to the imaging device. Such transmissions may also introduce distortion.

SUMMARY OF THE INVENTION

A bilevel video reconstruction circuit for a character imaging system removes pulse width distortion from a distorted bilevel video signal by generating a squarewave retiming signal that is a replica of the maximum frequency video signal that can be processed by the system. The positive and negative going transitions in the squarewave retiming signal are utilized to generate first and second groups of timing pulses respectively. The first and second groups of timing pulses are gated with the distorted bilevel video signal and an inverted version of the distorted bilevel video signal to provide a reconstituted bilevel video signal that exhibits the correct pulse widths.

DETAILED DESCRIPTION

Figures 1, 2:
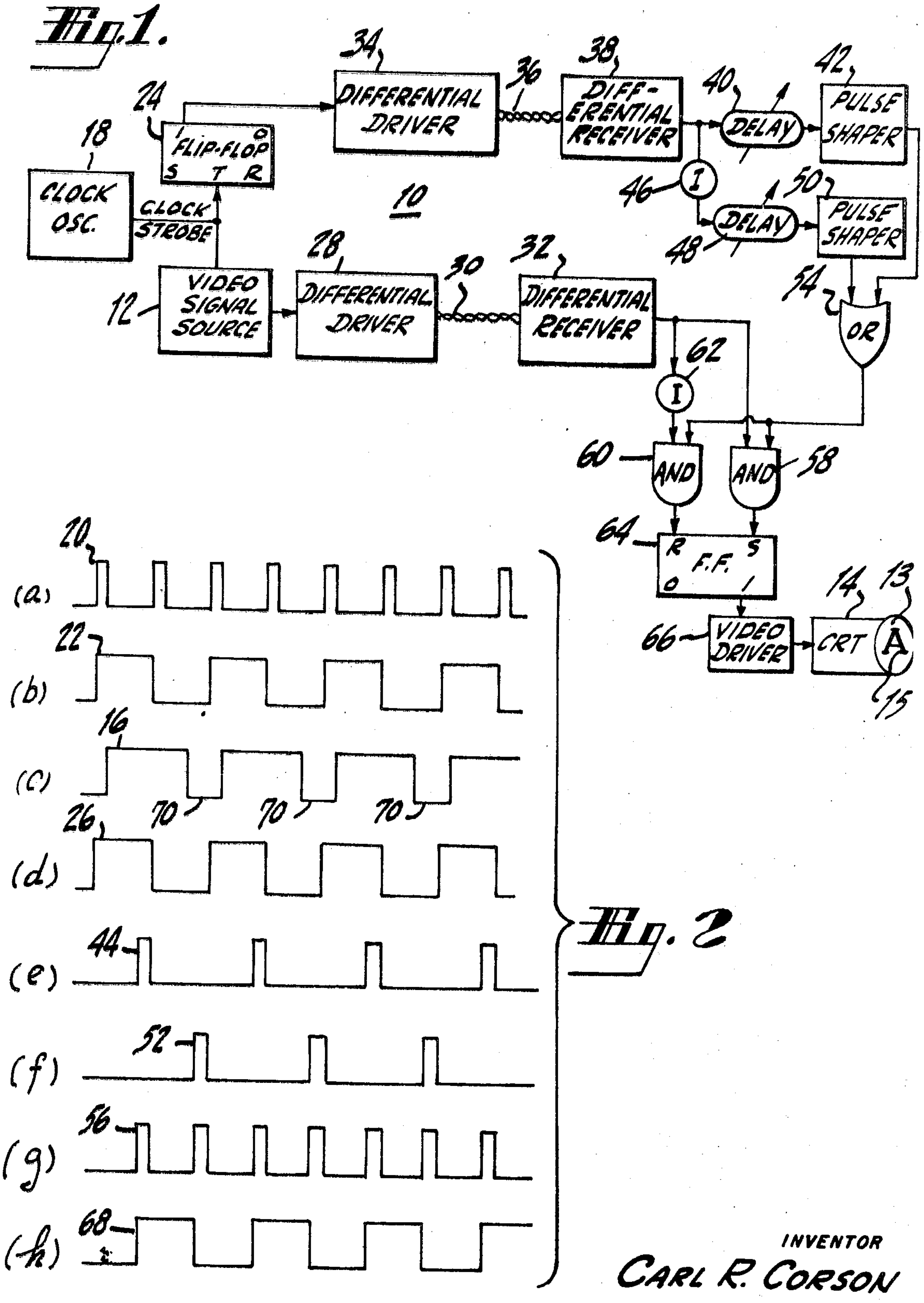
FIG. 1 is a schematic block diagram of a bilevel video reconstruction circuit embodying the invention.
FIG. 2 is a series of graphs illustrating the signals that occur in various parts of the circuit of FIG. 1.

Referring now to FIG. 1, a bilevel video reconstruction circuit 10 includes a source 12 of bilevel video signals which are to be displayed on the face 13 of an imaging device such as a cathode ray tube (CRT) 14. In an electronic photocomposition system, the source 12 may, for example, comprise the memory and associated processing circuits from which the bilevel video signals are derived. The video signals are bilevel since graphic characters 15 are formed by the bilevel blanking and unblanking signals applied to turn off and on the electron beam in the imaging device 14. The actual video signals from the source 12 may, for example, be such as that shown by the waveform 16 in line C of FIG. 2. The video signals are read from the source 12 at a clock strobe rate as determined by a strobe pulse signal derived from a clock oscillator 18. A strobe pulse signal 20 is shown in line *a* of FIG. 2. The video signal 16 in FIG. 2 is represented as a distorted signal with the video signal 22 in line *b* of FIG. 2 comprising the ideal undistorted video signal counterpart of the signal 16.

It is to be noted that the ideal video signal 22 is essentially a squarewave signal with the two levels in the signal exhibiting the same half periods. However, the distorted signal 16 exhibits a slight delay in the leading edge thereof and a longer delay in the trailing edge. If the leading and trailing edges were delayed the same amount, then, of course, there would be no distortion in the characters 15 formed on the face 13 of the cathode ray tube 14. The pulse width distorted video signal 16 may, for example, be caused by failure of transistors to turn off at the correct time due to charge storage effects. The distortion may also be due to capacity storage effects in lead lines, and the like.

Since the ideal video signal 22 in FIG. 2 changes levels at the strobe pulse 20 rate, the video signal 22 is the maximum frequency signal that can be processed by the photocomposition system in which the reconstruction circuit 10 is embodied. The design of the reconstruction circuit 10 is based on the premise that if the video signals that occur at the maximum frequency rate can be accurately reconstructed, then the video signals that occur at lesser frequency rates can also be reconstructed. It is to be noted that even though the bilevel signals exhibit either pulse narrowing, or pulse widening distortion, they still exhibit the same frequency rate, i.e., pulse repetition rate, as the undistorted signal counterpart thereof. Thus, the transitions in levels for each period of the distorted bilevel signal 16 still exhibit the proper timing. For the maximum frequency signal these transitions are, of course, one half the pulse repetition rate of the strobe pulse signal 20. Accordingly, a retiming signal which is a replica of the maximum frequency signal is generated from the strobe pulse signal 20 by applying the strobe pulses from the oscillator 18 to the trigger input terminal T of a triggerable flip-flop 24. The retiming signal 26 as shown in line *d* of FIG. 2, is derived from the "1" output terminal of the triggerable flip-flop 24.

The video signal source 12 may be located remotely from the cathode ray tube 14 and consequently the single ended bilevel video signals from the source 12 are converted into a double ended output signal in a differential line driver 28 for transmission over a distance by a pair of twisted leads 30. Such transmission reduces noise pickup. A differential line receiver 32 is coupled to the twisted pair 30 to reconvert the double ended video signals to a single ended output signal. The retiming signal 26 from the flip-flop 24 is also applied to a differential line driver 34 wherein the retiming signal 26 is converted into a double ended output signal and transmitted via a pair of twisted leads 36 to a differential line receiver 38. The receiver 38 reconverts the retiming signal 26 into a single ended signal.

The retiming signal 26 is first delayed in a variable delay line 40 and then shaped by a pulse shaping circuit 42 to provide a train of timing pulses such as shown by the waveform 44 in line *f* of FIG. 2. The retiming signal 26 is also inverted in an inverter 46 and then applied to a second delay line 48. The delayed output thereof is shaped in a second pulse shaping circuit 50 to provide a group of timing pulses 52 as shown in line *f* of FIG. 2. The first 52 and second 44 groups of timing pulses are gated through an OR gate 54 to provide a composite signal 56 shown in line *g* of FIG. 2. The composite signal 56 is applied as one input to a pair of AND gates 58 and 60. The other input to the AND gate 58 comprises the pulse width distorted video signal 16 derived from the differential line receiver 32 whereas the other input to the AND gate 60 comprises an inverted pulse width distorted signal as derived from an inverter 62. The AND gates 58 and 60 are coupled respectively to the set (S) and reset (R) terminals of a video flipuop 64. The "1" output terminal of the flip-flop 64 is coupled to a video driver 66 that is coupled to blank and unblank the electron beam (not shown) in the cathode ray tube 14 to cause graphic characters such as shown by the character 15 to be formed on the face thereof.

OPERATION

In describing the operation of the video reconstruction circuit 10, it is assumed that a maximum frequency signal is first derived from the video signal source 12 so that the circuit 10 can be adjusted to reconstruct such a signal and thus eliminate the necessity of readjusting the circuit 12 for lower frequency signals. Such a maximum frequency video signal exhibits the pulse width distortion shown by the distorted signal 16 in FIG. 2. The distorted signal 16 is reconstructed into an ideal signal 22 by the reconstruction circuit 10.

The clock strobe signal 20 is applied to the triggerable flip-flop 24 to generate a retiming signal 26 of half the pulse repetition rate of the strobe signal 20. The retiming signal 26 is a replica of the maximum frequency signal 22. The retiming signal 26 after processing by the receiver 38 is delayed in the delay line 40 and shaped in the pulse shaper 42 to provide the group of timing pulses 44. The pulse shaper 42, may for example, comprise a one-shot multivibrator that is triggered on the deloyed leading edge of a pulse in the retiming signal 26 to produce a relatively narrow pulse output therefrom. Thus, the group of timing pulses 44 are generated by the positive going transitions in the retiming signal 26. The retiming signal 26 is also inverted in the inverter 46 and delayed and shaped in the delay line 48 and pulse shaper 50 to provide the group of timing pulses 52. The pulse shaper 50 may be identical to the shaper 42 but since the retiming signal is inverted, the pulse shaper 50 produces a timing pulse 52 on each negative going transition in the retiming signal 26. The delay line 48 is adjusted so that the group of timing pulses 52 occur at the approximate center of the narrowest portion of the distorted video signal waveform 16. The narrowest portions of the distorted signal 16 are shown by the reference number 70 in line *c* of FIG. 2. The delay line 40 is then adjusted to center the second group of timing pulses 44 between the first group of timing pulses 52. The effect of shifting the first and second groups of timing pulses in relation to each other is to provide the correct timing signals that locate the transitions in amplitude that should occur in an ideally reconstructed maximum frequency video signal. Accordingly, the composite signal 56 of the first and second groups of timing pulses are utilized to gate the distorted waveform 16 through the AND gates 58 and 60, respectively.

As shown in line *h* of FIG. 2, the first timing pulse in the composite waveform 56 activates the AND gate 58 since the first elongated pulse in the distorted signal 16 has already enabled the gate 58. Consequently, the flip-flop 64 is set to produce the first output pulse in the reconstructed waveform 68. The flip-flop 64 remains set until the second timing pulse in the composite signal 56 arrives to activate the AND gate 60 and reset the flip-flop 64. The AND gate 60 had been enabled previously because the inverted narrow pulse 70 in the distorted signal 16 arrived at the gate 60 beforehand. Succeeding timing pulses set and reset the flip-flop 64 at the maximum frequency signal rate and therefore produce the reconstituted video signal 68. The video signal 68 is a replica, albeit a delayed replica, of the ideal maximum frequency signal 22. The delay exhibited, of course, only shifts the positioning of the character 15, but does not distort it.

A maximum frequency signal can exhibit up to slightly less than $\pm 50\%$ pulse width distortion and can still be reconstituted accurately by the circuit 10.

It is noteworthy that the circuit 10 not only compensates for pulse width distortion that occurs prior to the video reconstruction, but it can also be adjusted to compensate for pulse width distortion that occurs after this process takes place. In other words, the final adjustment of the variable delay lines 40 and 48 would normally be such that the video signal at the video driver 66 output would be a replica of the original video, thus eliminating the pulse width distortion that occurs in the video driver modules.

Thus, in accordance with the invention, a bilevel video reconstruction circuit is provided that removes pulse width distortion from bilevel video signals.

What is claimed is:

1. A video reconstruction circuit for removing pulse width distortion from distorted bilevel video signals in a graphic imaging system that processes video signals at frequencies up to a maximum frequency, comprising in combination, means for generating a bilevel retiming signal at said maximum frequency rate, first means for generating a first group of timing signals based on predetermined transitions in said bilevel retiming signal, second means for generating a second group of timing signals based on the remaining transitions in said bilevel retiming signal, means for centering timing signals from one of said groups between timing signals in the other group, and means for gating distorted bilevel video signals and an inverted version of said distorted bilevel video signals with said first and second groups of pulses to provide a reconstructed bilevel video signal.

2. The combination in accordance with claim 1 wherein said retiming signal comprises a squarewave signal.

3. The combination in accordance with claim 2 wherein said retiming signal is generated in a triggerable flip-flop coupled to be triggered by the strobe signal of said graphic imaging system.

4. The combination in accordance with claim 3 wherein said gating means comprises a first AND gate to which said timing signals and said distorted bilevel video signals are applied, and a second AND gate to which said timing signals and an inverted version of said distorted bilevel video signals are applied.

5. The combination in accordance with claim 4 that further includes a flip-flop having a first terminal coupled to the output of said first AND gate, and a second terminal coupled to the output of said second AND gate.

References Cited

UNITED STATES PATENTS 3,195,056 7/1965 Trautwein ---------- 328—165

JOHN S. HEYMAN, Primary Examiner

S. D. MILLER, Assistant Examiner

U.S. Cl. X.R.

178—70; 307—268; 328—155